United States Patent [19]
Dory

[11] Patent Number: 6,023,660
[45] Date of Patent: Feb. 8, 2000

[54] METHOD AND DEVICE FOR THE PROCESSING OF SIGNALS REPRESENTATIVE OF WAVES REFLECTED OR TRANSMITTED BY A VOLUMINAL STRUCTURE WITH A VIEW TO EXPLORING AND ANALYZING SAID STRUCTURE

[76] Inventor: Jacques Dory, Le Moulin Brûlé –Rue du Bas de Villiers, 77580 Villiers sur Morin, France

[21] Appl. No.: 08/910,878

[22] Filed: Aug. 13, 1997

[30] Foreign Application Priority Data

Aug. 14, 1996 [FR] France .................................. 96 10325

[51] Int. Cl.⁷ .................................................. G01N 29/00
[52] U.S. Cl. .................................. 702/39; 702/66; 73/602
[58] Field of Search ........................... 702/39, 66; 73/602, 73/620, 627; 367/87, 903

[56] References Cited

U.S. PATENT DOCUMENTS

| | | | |
|---|---|---|---|
| 4,165,649 | 8/1979 | Greer, Jr. .................................... | 702/39 |
| 4,452,082 | 6/1984 | Miwa ......................................... | 73/602 |
| 4,655,228 | 4/1987 | Shimura et al. ........................... | 73/602 |
| 4,706,031 | 11/1987 | Michiguchi et al. .................... | 324/329 |
| 4,787,393 | 11/1988 | Fukukita et al. ......................... | 348/163 |
| 5,029,475 | 7/1991 | Kikuchi et al. ............................ | 73/602 |
| 5,347,495 | 9/1994 | Cherek et al. . | |
| 5,351,544 | 10/1994 | Endo et al. ................................ | 73/602 |

FOREIGN PATENT DOCUMENTS

| | | |
|---|---|---|
| 168565A | 1/1986 | European Pat. Off. . |
| 612502A | 8/1994 | European Pat. Off. . |
| 64001958 | 6/1989 | Japan . |
| 2263180 | 10/1990 | Japan . |
| 4184185 | 1/1992 | Japan . |
| 9119457 | 12/1991 | WIPO . |

*Primary Examiner*—Marc S. Hoff
*Assistant Examiner*—Bryan Bui
*Attorney, Agent, or Firm*—William A. Drucker

[57] ABSTRACT

Method for processing signals representative of waves reflected or transmitted by an object, in order to analyze the structure of this object, this method comprising the transmission of incident waves into the structure, the reception of waves reflected or transmitted by portions of the structure encountered by the incident wave inside the object, by a plurality of detection elements independent from each other, the storage after digitization of the data received in a field memory, the computation, for each point of the object, of the positions occupied in the field memory by the signals detected by the elements at a given moment and corresponding to the waves reflected or transmitted by the point, then the application, to all the data contained in the field memory, relating to each point, of operations of which the result indicates the size of the wave reflected or transmitted by the point.

17 Claims, 2 Drawing Sheets

METHOD AND DEVICE FOR THE PROCESSING OF SIGNALS REPRESENTATIVE OF WAVES REFLECTED OR TRANSMITTED BY A VOLUMINAL STRUCTURE WITH A VIEW TO EXPLORING AND ANALYZING SAID STRUCTURE

BACKGROUND OF THE INVENTION

1. Field of the Invention

This invention relates to a method and a device for the processing of signals representative of waves reflected or transmitted by a voluminal structure with a view to exploring and analyzing this structure.

It applies notably, though not exclusively, to the manufacture of items of equipment such as echographs, nondestructive object monitoring devices, sonars, or even radars.

2. Description of the Prior Art

Conventional equipment of this type usually uses a transmission means which transmits an incident wave into the medium to be examined and a reception means which may use all or part of the transmission means (homodyne systems) which receive the waves reflected by the structures encountered by the incident wave. A means is further provided to transform and process the signals received by the reception means and to present them in a form that can be used by the user, e.g. in the form of an image enabling the position of the obstacles generating reflections of the incident wave to be located.

The method most commonly used to obtain these results consists in using pulse waves according to a process consisting in transmitting a pulse in a given direction (shot), in detecting the return of the echoes, in measuring the amount of time lapsed between transmission and reception and in deducing the distance and therefore the position of the obstacle that generated each echo. This shooting process is then repeated for different directions, according to a predetermined sweeping law.

Once the sweeping has been performed, it is then possible to generate, e.g. on a conventional display system, images showing the obstacles detected by the echoes, and of which the positions are known.

Numerous items of equipment of this type use a so-called "sequential method" according to which the structure is examined line by line by means of a mobile beam, the exploration line being displaced after each shot.

Under these conditions, the speed of examination increases with the cross-section of the exploring beam and with the rate of the pulses. However, it so happens that the cross-section of the beam is limited by the spatial resolution required, whereas the pulse rate is limited by the time required for all the different reflected echoes to return to the probe.

For example, in order to examine a plate of aluminium to detect flaws of 1 mm in diameter, with a 3-mm resolution, the cross-section of the beam cannot really exceed 2 mm, and the pulse rate must be lower than 1,000 Hz in view of the reverberation phenomenon.

Under these conditions, the speed of surface examination cannot exceed 2 mm×2 mm×1,000=4,000 mm$^2$/second, i.e. $^4/_{1,000}$ths of a m$^2$, i.e. for one hour $^4/_{1,000}$×3,600=14.4 m$^2$. At the end of production, this speed is often too slow as it slows down production, whence the need sometimes to operate several installations simultaneously.

With numerous other applications (inspection of pipes, track rails, etc.), this limitation is even more critical.

With a view to obviating these drawbacks, it has already been proposed that there be transmitted, onto the object to be explored, a substantially flat wave, of relatively large cross-section, generated by a probe constituted by a network comprising a plurality of transmission/reception devices of small size, preferably smaller than a wave length, in order to avail of a very large radiation pattern; these transmission devices being driven simultaneously, in parallel. At reception, each transmission/reception device operates independently and therefore separately receives the waves reflected by the obstacles intercepting the beam situated in its service area. After digitization, the data supplied by these transmission devices (field of reflected waves) are stored in the memories which are read in reverse order to the order of writing.

The read signals are then applied to a device for reconstituting the field of reflected waves which comprises a plurality of transmitting devices distributed in accordance with a structure similar to that of the transmission/reception devices of the aforesaid probe. The application of the read signals to these transmitting devices is performed in correspondence with the transmission to the memory of the write signals by the transmission/reception devices.

The purpose of the reconstitution device is to reproduce the field of reflected waves in an auxiliary medium in order to reproduce an image of the object, with a resolution which depends on the wave length of the incident wave and the dimension of the probe elements.

Should the incident wave be an ultrasonic wave, the simplest solution is to form the image in an optically transparent medium and to view it by means of the Schlieren method.

However, this method is not very suitable for industrial purposes. Furthermore, it is not linear and does not enable the high frequency components to be restored.

According to another method, the image is collected on a third probe and the reading frequency is modulated so that the image of the structure is always "checked out" when the corresponding signals arrive on this probe.

It so happens that this system is complex and requires probes with a very large band. Moreover, after passing through three successive probes, the signal becomes deteriorated. Furthermore, additional difficulties occur when the transmission wave is slanted or circular.

OBJECT OF THE INVENTION

The main object of this invention is to remedy the preceding disadvantages.

SUMMARY OF THE INVENTION

Accordingly, the invention is based on the observation that, in a process such as the one described above, each point of the object to be explored gives rise to a back wave which is memorized in positions of the memories distributed in the form of hyperbola arcs of which the characteristics depend on the distance from the point to the probe and on the radiation pattern of each element (these hyperbolae are theoretically no more than the two asymptotes for the points situated against the probe).

Thus, the method according to the invention consists, on the one hand, in calculating read addresses in such a way that these addresses correspond exactly to the signal stored for one point of the object at one given moment, so that these addresses are distributed in a field memory comprising said areas according to a hyperbolic law and, on the other hand, in rereading the field memory according to said law, so as to have each point of the object explored correspond to the result of a computation performed on a plurality of particular points of the memory field in which are stored the data concerning the field reflected or modified by the point of the object.

All the lines of the field memory are reread in parallel and the values are added (either directly in digital form, or in analog form after digital-to-analog conversion) to give rise to a voltage Vp of which the value is inserted into an "image" memory comprising a plurality of points to each of which corresponds a reading law, e.g. hyperbolic, whose parameters depend on the coordinates of this point.

In view of the fact that the computation of each reading law is too long to be performed in real time, this computation is performed beforehand and the results are stored in specific "address" memories, associated with each line of the "field" memory.

The read process is performed as follows:

In the case of each point of the "image" memory, the coordinates of this point are transmitted in parallel to all the "address" memories. The latter immediately supply, in parallel, the address of each "field" memory line enabling the corresponding reading law (e.g. hyperbola) to be generated. The corresponding voltage Vp is then stored in the "image" memory at the address of said point.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENTS

Figure 1:
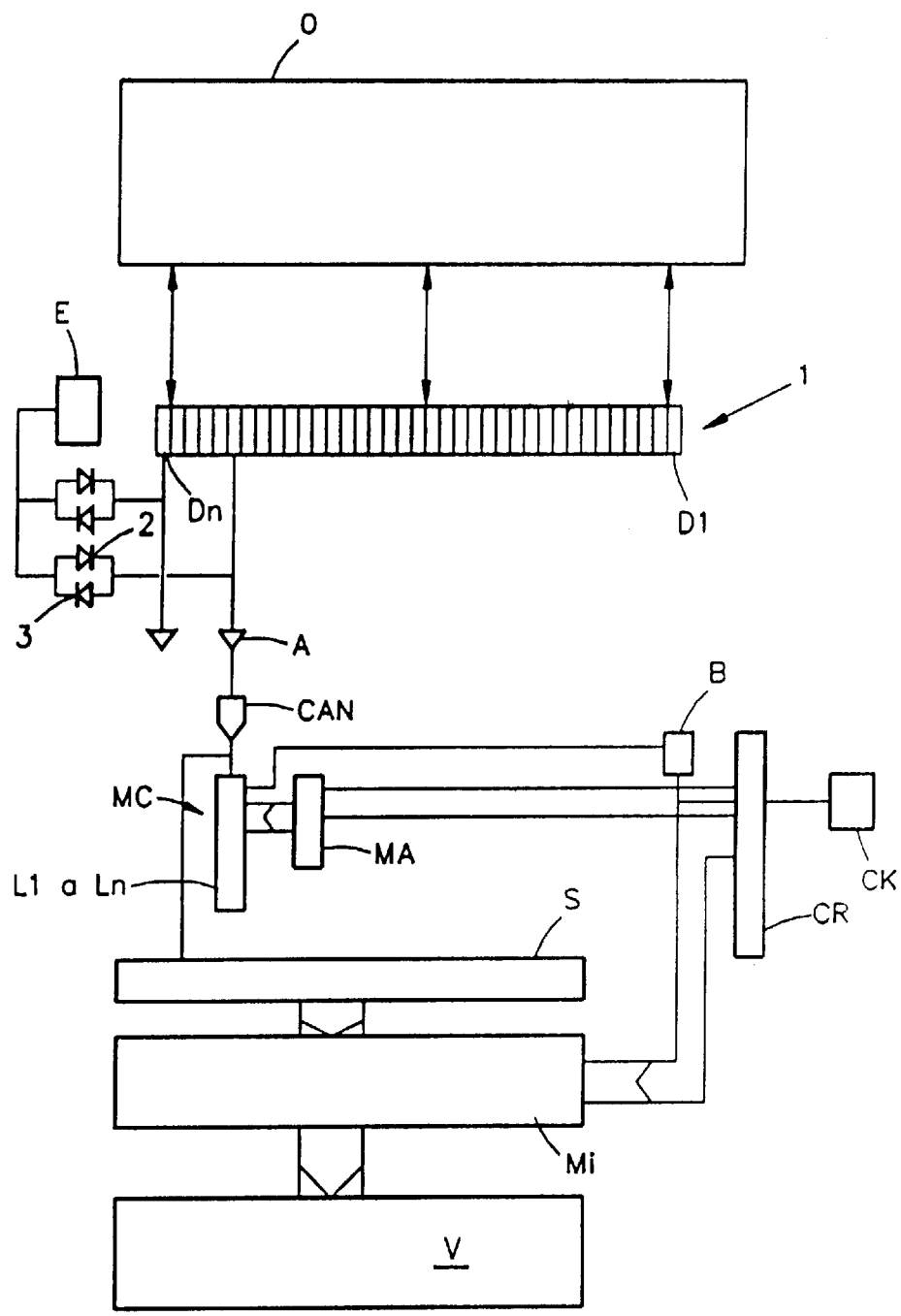
FIG. 1 is a theoretical diagram of a device for exploring and analyzing a voluminal structure.

The device represented in FIG. 1 can be used in ultrasonic equipment using pulse reflection for nondestructive monitoring of materials or medical image formation.

It uses a probe 1 constituted by a linear strip comprising a plurality of transmitter/receiver elements $D_l$ to $D_n$ of small size (1 mm) e.g. 128 in number. Accordingly, the same probe 1 is used for transmission and for reception.

Each element $D_l$ to $D_n$ is connected, on the one hand to an area, in this instance a respective line $L_l \ldots L_n$ of a "field" memory MC via a preamplifier A and an analog-to-digital converter CAN, and, on the other hand, to a transmitter E via two diodes 2, 3 mounted head-to-foot and having a conduction threshold e.g. of the order of a fraction of a volt.

Thus, when the transmitter E transmits while supplying a voltage that can be as high as some 100 alternating volts, the diodes 2, 3 associated with all the transmitter/receiver elements $D_1$ to $D_9$ are largely conductive and behave like short circuits, to the extent that all the elements $D_1$ to $D_9$ are excited in parallel by the transmitter E and therefore produce a plane wave.

Conversely, upon reception, each element $D_1$ to $D_9$ operates independently and drives the preamplifier A to which it is connected. In fact, the signals detected by the elements are weak (a few dozen millivolts).

This arrangement has the further advantage of reducing the input noise by isolating the preamplifiers A from the transmission circuit.

Each preamplifier A then drives a corresponding analog-to-digital converter CAN and the digital signals are stored in the lines of the memories $L_l$ to $L_n$ at write addresses supplied by an addressing memory MA itself addressed by a counter CR driven by a clock CK. This counter CR and this clock CK are common to all the addressing memories MA associated with the memory lines $L_l$ to $L_n$.

When the memory lines $L_l$ to $L_n$ are written, the outputs of the addressing memories correspond to the address. It is as though the field memory lines $L_l$ to $L_n$ were addressed in parallel by the counter CR.

Advantageously, the number, No, of memory positions used during the write operation is selected among the powers of two, e.g. 512, 1,024, etc.

If, e.g. No is equal to 512, the positions 0 to 511 of the field memory are written.

Immediately after the writing, the memories $L_l$ to $L_n$ are switched to the read position by means of a flip-flop B controlled by bit 10 of the counter CR.

From address 512 onwards, the outputs of the field memory lines $L_l$ to $L_n$ are no longer identical but are calculated in such a way that the memory positions addressed correspond to a predetermined shape (read hyperbola).

Figure 2:
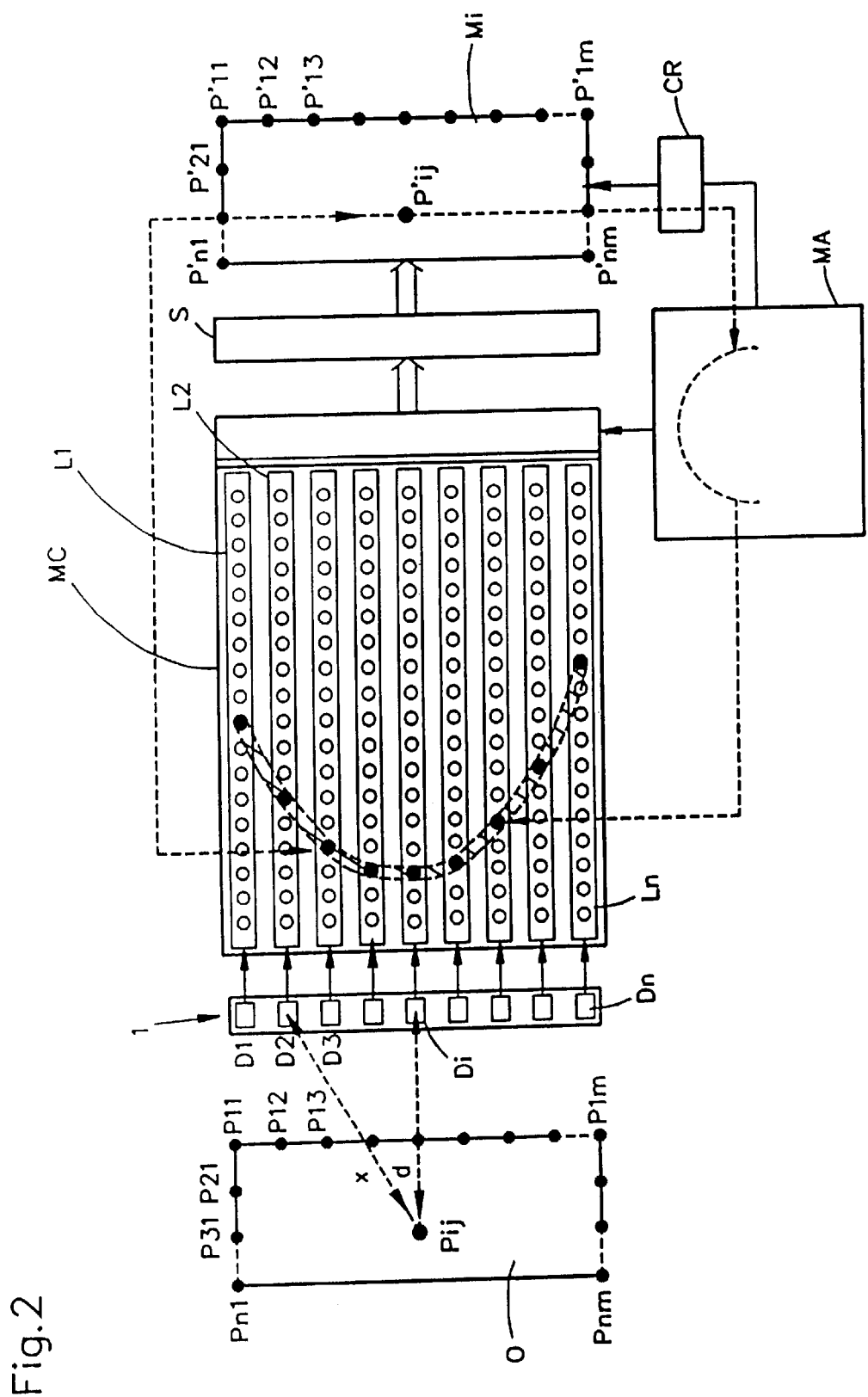
FIG. 2 is a schematic representation illustrating the operating principle of the device represented in FIG. 1.

This computation is performed as follows: from address 512 onwards, the counter CR addresses a position P'ij of a memory Mi (FIG. 2). To each point $P'_{ll}$ to $P'_{nm}$ of this memory Mi is made correspond a position $P_{ll}$ to $P_{nm}$ of the object examined O, so that this "image" memory Mi can be subsequently used to provide an image of the object O.

For each of these points $P'_{ll}$, $P'_{nm}$, the positions occupied in the field memory lines $L_l$ to $L_n$ are calculated by the reflected ultrasonic pulse, taking into account the shape of the field transmitted, the frequency of digitization, the speed of sound, the position of the object in relation to the probe. Thus, for the point Pij of the object which corresponds to the point P'ij of the "image" memory Mi, the positions occupied in the field memory MC are arranged according to a hyperbola indicated by the hatching.

If the probe 1 is directly in contact with the object, digitization can begin at the same time as the transmission. When working with an acoustic relay, the start of the digitization can be deferred by a period equal to the return journey in the relay.

The values read in the different memories (e.g. the values contained in the cells of the memory lines situated on the hyperbola H relating to the point Pij) are added up in an adding circuit S and sent to the selected position of the memory Mi (e.g. the position P'ij).

As previously mentioned, the data contained in the memory Mi can be used in different ways.

They can serve to form an image on a viewing screen V of the conventional type.

These data can also be processed, e.g. by logic circuits enabling identification and recording of the type of faults detected in the case of nondestructive monitoring.

The addressing memories MA can also be read-only memories (ROM, PROM, EPROM) programmed for once and for all. However, from the point of view of speed and flexibility of use, it is preferable to use memories that can be reprogrammed once they have been installed, e.g. RAMs.

The programming can then be performed at the time of starting up. The prior computation can be performed by a minicomputer depending on the examination conditions and the probe model used. The data can also be precomputed and stored on disk or in a PROM. The results are then transferred sequentially into the memory MA by a conventional method. This transfer can be very fast (a few seconds).

A method of computing the addresses in the addressing memories MA will be described hereinunder in reference to FIG. 2.

Let Pij be a point situated at a distance d from the probe vertically above the detection element Di. To this point Pij is made correspond a position P'ij in the "image" memory MI, and therefore an address supplied by the counter CR.

Let x be the distance separating the element $D_l$ from the probe 1 and the element Di vertically above the point Pij, and c be the speed of sound in the object medium.

If we presuppose that the wave transmitted by the probe 1 is plane and is propagated perpendicularly to the surface of the probe 1, the time t(x) taken by the pulse to reach a detection device, e.g. $D_3$, after reflecting on the point Pij, is equal to d/c (time taken by the wave transmitted to reach Pij)+the square root of $(x^2+d^2)$/c:

$$t(x) = \frac{d + \sqrt{(x^2 + d^2)}}{c}$$

If the frequency of writing is designated by f and if the writing starts at the same time as the transmission, the reflected signal will be stored in the cell of the field memory MC situated on the x-axis at the position f.t(x).

It is the value f.t(x) that will be stored in the memory MA to be used for the read operation.

If the wave does not propagate perpendicularly to the probe (oblique incidence probing) or if the wave is not plane (circular wave in the case of sectorial probing), the calculation is performed very similarly, the only difference being the time taken by the wave to reach a point Pij. This time will depend not only on d, but also on the lateral position of the point Pij in relation to the probe 1. If the wave is oblique, the time will vary linearly as a function of the lateral position Xp, the time taken by the wave transmitted to reach the point Pij being equal to (d.cos(θ)+Xp.sin θ/C), θ being the angle of the beam emitted in relation to the normal line of the probe 1.

In the event of the waves generated by the probe 1 being continuous or semi-continuous or of these waves coming in the form of a train of waves of sufficient duration to cover the entire object, each point will give rise to a back wave of duration such that it will be memorized in virtually all the positions of the memory lines MC, and the corresponding data of the different points will be superposed.

It might then be considered that a "section" of these memories will contain all the data corresponding to the object, provided this section will be of sufficient "thickness" to contain the biggest of hyperbolae.

Reading of this single section will therefore be theoretically sufficient to recreate the image of the object.

This reading may take place while gradually modifying the shape of the read hyperbolae, or by "checking out" on an area situated at a given distance.

Digitization of the signal must then be performed for a larger number of levels in order to enable satisfactory discrimination of the different data.

To simplify the electronics, it might then be envisaged that the memories MC be sequentially addressed during writing, the rereading always being in parallel (only one single preamplifier and one single analog-to-digital converter will then be necessary).

The speed of acquisition will then be notably reduced, but the resolution remains high. This solution can be of interest when speed is not a priority. Mixed solutions can also be envisaged: parallel writing on groups of memories, these groups being addressed sequentially.

In the example described above, the ultrasonic signal is memorized before detection, therefore at the high frequency level. The sampling frequency must be at least equal to three times the ultrasonic frequency, i.e. for instance 10 MHz for an ultrasonic wave of 3 MHz.

Thus, should one wish to test a depth of 10 cm in steel, the time of the maximum return journey is equal to approximately 60 microseconds, i.e. 600 points sampled per line.

For a 100-line image, it will therefore be necessary to compute 600×100=60,000 points.

In this instance, the computation is no more than a simple reading of the memory followed by an addition. With modern circuits, this operation can be performed in 1/100th of a microsecond. The entire image will therefore be calculated in 60,000/100=600 microseconds.

Memorizing of the field will have lasted 60 microseconds, and the total acquisition time of an image will therefore be equal to 660 microseconds, the image speed can therefore be greater than 1,000 Hz.

Should this speed prove insufficient, it can be increased in several ways:

a) Division of the field memory into several submemories read in parallel;

b) Selection and processing of no more than the memory area containing the useful data.

It should be noted that ultrasonic waves often come in the form of a brief pulse comprising several alternations, in which case it can be of interest to use several read hyperbolae intercepting these alternations. If the pulse is short and only comprises one complete alternation, a hyperbola can be used to reread the positive alternation and at a distance corresponding to a half period to reread the negative alternation. If Pp and Pm are the values obtained after these readings, the value P=Pp−Pm will be recorded. This solution can improve the signal-to-noise ratio and the resolution of the system. The two readings can be performed successively, to the detriment of speed, or in parallel by using two groups of memories.

The method according to the invention has numerous advantages by comparison with sequential methods.

Speed: A large surface area is explored with each shot, e.g. 100×5 mm, instead of 3×3 mm with the sequential method.

The speed of examination can be multiplied by 50 or 100 by comparison with the sequential method, and this is a substantial increase.

The speed of the system paves the way for numerous applications, e.g. three-dimensional imagery and Doppler image formation.

Three-dimensional images can be easily obtained when a matrix probe is used, but the electronics are very cumbersome as a conventional matrix probe comprises a very large number of elements. However, the number of elements can be substantially reduced by means of a random distribution of the latter over the surface of the probe, thus authorizing greater spacing apart of the elements without the interference lobes becoming too big. With a linear probe, a series of planes can be rapidly recorded by displacing the cutting plane after each shot. At a speed of 100 Hz, 100 cutting planes can be memorized in 1/10th of a second. The memories can be then used to obtain a three-dimensional view, or a cutaway view in any plane whatsoever.

As regards Doppler image formation, the application to Doppler imagery results from the fact that successive images can be compared. When the high frequency signal is memorized, very small differences between two images can be discerned (e.g. by subtraction) and highlighted.

Resolution: The system operates with a very high numerical aperture. In practice, the space resolution is only limited by the bigger of two values: the wave length, the dimension of an element. Thus, in the example mentioned, the greater of the two values is the wave length, i.e. 2 mm.

With a frequency of 10 MHz, the bigger of the two values will be the dimension of an element, i.e. 1 mm in this instance.

Reproducibility: The sensitivity of the system varies very little as a function of the position of an obstacle under the probe and the field is emitted in the form of a plane wave. Moreover, sensitivity variations as a function of the position can be calculated and therefore corrected, as the exact position of each obstacle in relation to the probe is known.

The system can operate with transmission wave fronts of any shape whatsoever (plane, oblique plane, cylindrical). In each case, it will be sufficient to compute the shape of the read hyperbolae as a function of their position.

I claim:

1. A method for processing signals representative of waves reflected or transmitted by an object having a structure, in order to explore and analyze said structure, said method comprising the following steps of transmitting at least one incident wave in said structure, receiving waves reflected or transmitted by a position of said structure encountered by said incident wave inside said object, by a plurality of detection elements, independent from each other, storing after digitizing data supplied by said detection elements in a field memory, reconstituting and/or analysing said structure from data read in said field memory, said method consisting in computing, for each point of said object, positions occupied in said field memory by the signals detected by said detection elements at a given moment and corresponding to the waves reflected or transmitted by said point, then in rereading said field memory, and in performing, on all the data contained in the memory positions containing data relating to each point, a series of operations so as to compute a value representative of the size of the wave reflected or transmitted by the point, this value then being processed or stored in a specific memory.

2. The method as claimed in claim 1, wherein the steps of computing the positions of the field memory containing the data relating to each point is performed beforehand, and the corresponding values are stored in addressing memories.

3. The method as claimed in claim 1, wherein said field memory has a plurality of line which are read in parallel, and the values read on said lines are subjected to a computation intended to obtain a magnitude which is stored in an image memory comprising a plurality of points to each of which corresponds a read addressing law having parameters depending on the coordinates of this point.

4. The method as claimed in claim 3, wherein said addressing law is a hyperbolic law, and the computation applied to the values read in the field memory is an addition.

5. The method as claimed in claim 3, wherein plural read addressing laws are associated with each point of the image memory.

6. The method as claimed in claim 1, wherein said incident waves are transmitted in the form of pulses.

7. The method as claimed in claim 1, wherein the incident waves are transmitted in the form of wave trains or of a continuous transmission, the hyperbolic law then being chosen so as to highlight the reflecting points situated at a predetermined distance.

8. The method as claimed in claim 1, wherein the transmission of the incident waves and reception of the waves reflected or transmitted are performed by the same means.

9. The method as claimed in claim 1, wherein the transmission of the incident waves and reception of the waves reflected or transmitted are performed by separate means.

10. The method as claimed in claim 1, wherein the incident wave fronts are plane.

11. The method as claimed in claim 1, wherein the incident waves are comprised of directive and/or focalized beams that do not overlap, these beams being displaced in the course of successive transmissions in order to cover the entire structure explored.

12. The method as claimed in claim 1, wherein said incident waves are generated by means of a linear network of independent transmission/reception devices.

13. The method as claimed in claim 1, wherein the incident waves are generated by means of transmission/reception devices arranged according to a matrix configuration.

14. The method as claimed in claim 1, wherein the incident waves are generated by means of transmission/reception devices arranged randomly.

15. A device for implementing the method as claimed in claim 1, wherein it comprises a probe comprised of a plurality of transmitter/receiver elements each connected, to a transmitter, via two conduction threshold diodes mounted head-to-foot, and, to an analog-to-digital converter, of which an output is connected to a write input of a field memory, of which the reading is controlled by an addressing memory driven by a clock via a counter, the field memories having a read output which is connected to an adder having an output connected to a write input of an image memory driven by said counter.

16. The device as claimed in claim 15, wherein said image memory is operated by a display device.

17. The device as claimed in claim 15, wherein at least one addressing memory is associated with each line of the field memory.

* * * * *